United States Patent [19]

Kohn et al.

[11] Patent Number: 5,055,116
[45] Date of Patent: Oct. 8, 1991

[54] GAS SEPARATION MEMBRANES COMPRISING MISCIBLE BLENDS OF POLYIMIDE POLYMERS

[75] Inventors: Rachel S. Kohn, Springfield, N.J.; Maria R. Coleman, Austin, Tex.; Tai-Shung Chung, Randolph, N.J.

[73] Assignee: Hoechst Celanese Corp., Somerville, N.J.

[21] Appl. No.: 505,099

[22] Filed: Apr. 3, 1990

Related U.S. Application Data

[63] Continuation-in-part of Ser. No. 355,711, May 22, 1989, Pat. No. 4,929,405.

[51] Int. Cl.$^5$ .................. B01D 53/22; B01D 71/64
[52] U.S. Cl. .................................. 55/16; 55/68; 55/158
[58] Field of Search ................... 55/16, 68, 158

[56] References Cited

U.S. PATENT DOCUMENTS

| | | | |
|---|---|---|---|
| Re. 30,351 | 7/1980 | Hoehn et al. | 55/16 |
| 3,649,601 | 3/1972 | Critchley et al. | 528/353 |
| 3,822,202 | 7/1974 | Hoehn et al. | 210/23 |
| 3,899,309 | 8/1975 | Hoehn et al. | 29/16 |
| 4,113,628 | 9/1978 | Alegranti | 210/500 M |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |
| 4,214,020 | 7/1980 | Ward et al. | 55/16 X |
| 4,225,868 | 9/1980 | Onder et al. | 525/432 |
| 4,367,135 | 1/1983 | Posey, Jr. | 55/16 X |
| 4,378,400 | 3/1983 | Makino et al. | 55/16 X |
| 4,512,893 | 4/1985 | Makino et al. | 55/158 X |
| 4,528,004 | 7/1985 | Makino et al. | 55/16 X |
| 4,542,257 | 9/1985 | Fraser et al. | 528/353 |
| 4,609,468 | 9/1986 | Cramm | 55/16 X |
| 4,645,824 | 2/1987 | Landis et al. | 528/353 |
| 4,690,873 | 9/1987 | Makino et al. | 55/16 X |
| 4,705,540 | 11/1987 | Hayes | 55/16 |
| 4,714,482 | 12/1987 | Polak | 55/16 X |
| 4,717,393 | 1/1988 | Hayes | 55/16 |
| 4,717,394 | 1/1988 | Hayes | 55/16 |
| 4,718,921 | 1/1988 | Makino et al. | 55/16 |
| 4,742,152 | 5/1988 | Scola | 528/353 |
| 4,746,474 | 5/1988 | Kohn | 264/41 |
| 4,801,682 | 1/1989 | Scola | 528/353 |
| 4,822,868 | 4/1989 | Mueller | 528/208 |
| 4,830,640 | 5/1989 | Nakamura et al. | 55/16 X |
| 4,838,900 | 6/1989 | Hayes | 55/16 |
| 4,857,079 | 8/1989 | Kimura | 55/16 |
| 4,880,442 | 11/1989 | Hayes | 55/16 |
| 4,880,699 | 11/1989 | Kohn | 428/333 |
| 4,897,092 | 1/1990 | Burgoyne, Jr. et al. | 55/158 X |
| 4,921,651 | 5/1990 | Polak et al. | 55/16 X |
| 4,929,405 | 5/1990 | Kohn | 55/16 X |
| 4,932,982 | 6/1990 | Hayes | 55/16 |
| 4,948,400 | 8/1990 | Yamada et al. | 55/16 X |
| 4,952,220 | 8/1990 | Langsam et al. | 55/16 X |
| 4,954,144 | 9/1990 | Burgoyne, Jr. et al. | 55/16 |

FOREIGN PATENT DOCUMENTS

| | | | |
|---|---|---|---|
| 0219878 | 4/1987 | European Pat. Off. | |
| 63-090533 | 4/1988 | Japan | 55/16 |
| 63-091122 | 4/1988 | Japan | 55/16 |
| 63-209730 | 8/1988 | Japan | 55/16 |
| 01-194905 | 8/1989 | Japan | 55/158 |

OTHER PUBLICATIONS

Chemical Abstract 100:139807v, vol. 100, 1984.
Chemical Abstract 100:139808w, vol. 100, 1984.
Kim, Koros, Husk and O'Brien, "Relationship Between Gas Separation Properties and Chemical Structure in a (List continued on next page.)

*Primary Examiner*—Robert Spitzer
*Attorney, Agent, or Firm*—Joseph M. Mazzarese

[57] ABSTRACT

The present invention provides for gas separation membranes which are engineered to have specific gas transport properties based on the blending of certain polymers. In preferred embodiments, the blended polymers are polyimides which have different molecular structures and different gas transport properties. Despite these differences, however, the polymers are completely miscible and can be effectively utilized to prepare gas separation membranes having specifically tailored properties.

22 Claims, 2 Drawing Sheets

OTHER PUBLICATIONS

Series of Aromatic Polyimides", 37 Journal of Membrane Science 45 (1988).

Muruganandam and Paul, "Evaluation of Substituted Polycarbonates and a Blend with Polystyrene as Gas Separation Membranes", 34 Journal of Membrane Science 185 (1987).

Hopfenberg and Paul, "Transport Phenomena in Polymer Blends", Polymer Blends, vol. 1, pp. 445-489.

Encyclopedia of Polymer Science and Engineering, vol. 9, pp. 561-568 (1985).

Rånby, "Two-Component Polymer Systems: Physical Properties as Related to Compatibility and Interaction", 51 J. Polymer Sci. 89 (1975).

Kim, Koros and Husk, "Advanced Gas Separation Membrane Materials: Rigid Aromatic Polyimides", 23 Separ. Sci. and Tech. 1611 (1988).

Muruganandam and Paul, "Gas Sorption and Transport in Miscible Blends of Tetramethyl Bisphenol-A Polycarbonate and Polystyrene", 25 Journal of Polymer Science 2315 (1987).

Chiou, Barlow and Paul, "Sorption and Transport of Gases in Miscible Poly(Methyl Acrylate)/Poly(Epichlorohydrin) Blends", 30 Journal of Applied Polymer Science 1173 (1985).

Paul, "Gas Transport in Homogeneous Multicomponent Polymers", 18 Journal of Membrane Science 75 (1984).

Chern, Koros, Hopfenberg and Stannett, abstract of article entitled, "Material Selection for Membrane-Based Gas Separations", ACS Symp. Ser., vol. 269 (1985).

Stern, Mi and Yamamoto, "Structure/Permeability Relationships of Polyimide Membranes, Applications to the Separation of Gas Mixtures", 27 Journal of Polymer Science, vol. 27, 1887-1909 (1989).

Koros, "Simplified Analysis of Gas/Polymer Selective Solubility Behavior", 23 Journal of Polymer Science, vol. 23, 1611-1628 (1985).

Kima and Koros, "Temperature Effects on Gas Permselection Properties in Hexafluoro Aromatic Polyimides", Dept. of Chemical Engineering, The University of Texas at Austin.

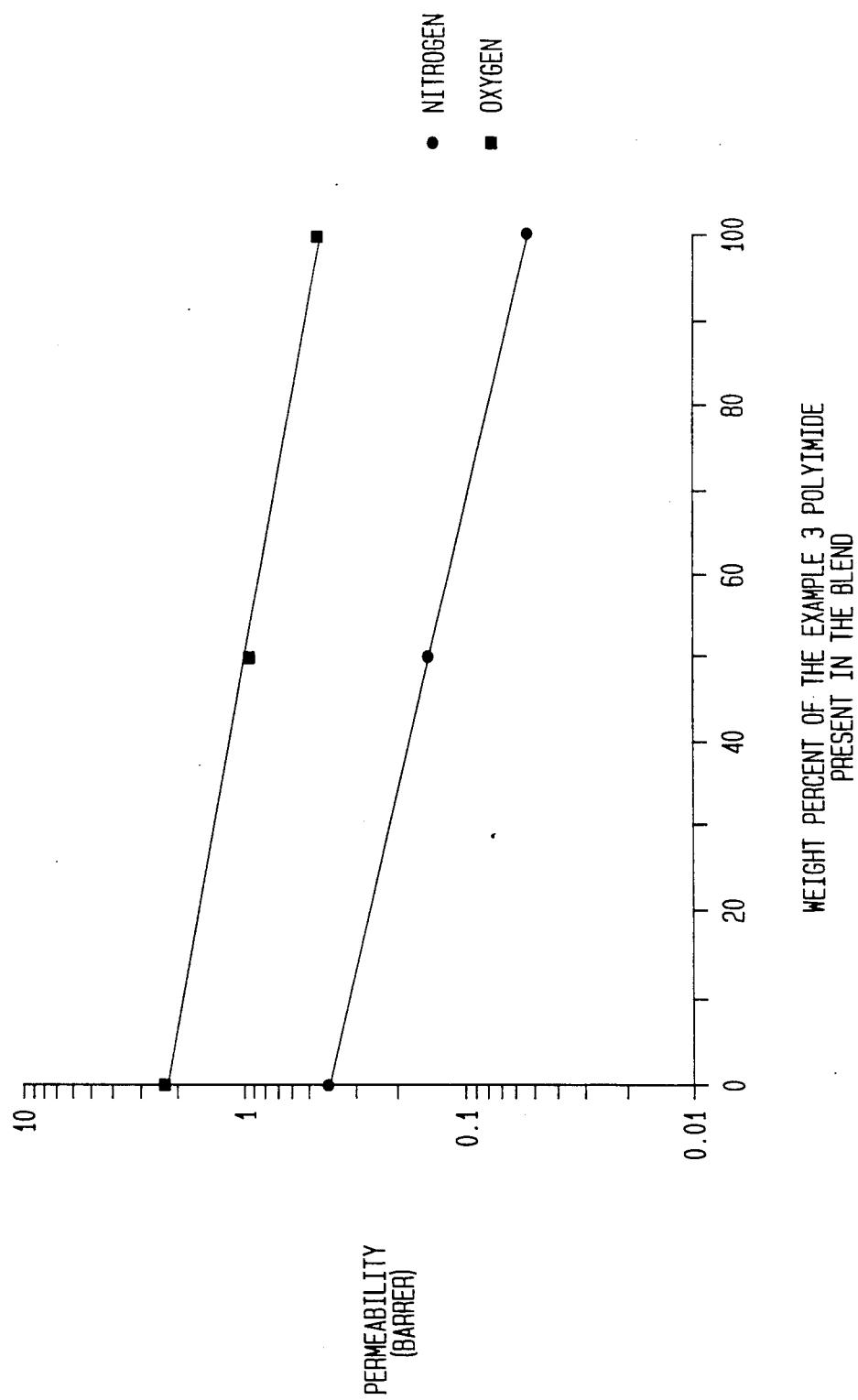

GAS SEPARATION MEMBRANES COMPRISING MISCIBLE BLENDS OF POLYIMIDE POLYMERS

RELATED APPLICATION

This application is a continuation-in-part of commonly owned, copending U.S. Pat. application Ser. No. 07/355,711 (Attorney Docket No. 1152ZABC) filed May 22, 1989 in the name of Rachel S. Kohn and entitled "Ultrathin Polyimide Polymer Films And Their Preparation," now U.S. Pat. No. 4,929,405, the entire content of which is expressly incorporated hereinto by reference.

FIELD OF THE INVENTION

The present invention relates generally to gas separation membranes cast from a polymer blend. More specifically, the invention relates to gas separation membranes which are "engineered" to have specific physical (e.g., transport) properties based on the blending of specific miscible polymer components, and particularly, the amount that each polymer component is present in the blend.

BACKGROUND AND SUMMARY OF THE INVENTION

It is well known to employ permeable membrane to separate or selectively enrich a gas mixture. For example, membranes are used in the separation of $H_2$ from supercritical gasses including $N_2$, CO and $CH_4$; the separation of $CO_2$ and water vapor from natural gas; and the enrichment of air by nitrogen or oxygen. In addition, hydrogen is recovered from ammonia production plants using large scale membrane technology, and, likewise, hydrogen is recovered from coal gassification processes for the production of synthetic fuel.

The fundamentals of gas separation are based upon a permeability equation, which at low pressures in the absence of strong interactions between gas components may be expressed as:

$$\alpha_{AB} = P_A/P_B$$

where:

$\alpha_{AB}$ is referred to as the ideal separation factor;

$P_A$ is the permeability of gas component A in the membrane; and $P_B$ is the permeability of gas component B in the membrane.

It is generally known that gas separation membranes may be cast from polymers. The separation of gas components by polymer membranes is thought to depend on chemical affinities, kinetic diameters and structural characteristics; it being known generally that rubbery polymers are characterized by high diffusion and relatively low selectivity while glassy polymers are characterized by lower diffusion and higher selectivities.

In any given situation, however, it is presently impossible to engineer or tailor the physical properties (e.g., gas transport properties such as permeability and selectivity) of a polymer membrane with any reasonable degree of confidence. That is, there is currently no reliable and/or convenient method available by which the final properties of a new polymer membrane may be predicted so that a membrane with those desired final properties can then be manufactured. Rather, the properties can only be determined accurately after a membrane is formed from a particular polymer composition and then physically tested for its efficacy to separate a gas (or gasses) of interest.

Thus, although various synthesized copolymer materials are effective for use as gas separation membranes, the gas transport properties of the membranes, e.g., gas permeability and separation, are limited in the sense that they are a direct result of the characteristics of the synthesized copolymer and are not predictable based on the properties and ratios of the monomers utilized. Consequently, &he permeability and selectivity of such membranes can not be readily tailored for specific applications requiring an increase or a decrease in permeability and/or selectivity with respect to certain gasses.

According to the present invention, however, polymer membranes can now be "engineered" to have physical properties tailored for specific end-use applications. Surprisingly, it has now been discovered that certain different polymers with known properties can actually be blended to yield engineered polymer membranes (i.e., membranes having tailored properties for specific end-use applications).

Prior to the present invention, polymer blending has traditionally been thought to be either problematic or of no benefit in the membrane field. Polymer blending has been viewed as problematic because different polymers are generally not miscible with one another. Those few polymers which are thought to be miscible offer no blending advantage in the membrane field because of various reasons, including difficulty in blending, poor mechanical properties, limited range of gas transport properties, and complex relationships between blend composition and gas transport properties.

It has now been discovered, however, that certain polymers form miscible blends and offer all the advantages of ease of preparation, predictability, and the possibility of tailoring gas transport properties over a broad range. The gas transport properties of a membrane resulting from a blend according to the present invention can be predicted based on a linear relationship between the logarithms of the respective permeabilities of the individual components of the blend and the weight percent of those components. This relationship allows facile tailoring of the transport properties of the blend. While this type of semilogarithmic relationship has been described in the literature, it is considered to be a special case (i.e., special in that there can be no extrapolation to other polymer blends), not a general case. Muruganandam and Paul, *Gas Sorption and Transport in Miscible Blends of Tetramethyl Bisphenol-A Polycarbonate and Polystyrene*, 25 Journal of Polymer Science 2215-29 (1987); and Chiou, Barlow, and Paul, *Sorption and Transport of Gases in Miscible Poly(Methyl Acrylate)/Poly(Epichlorohydrin) Blends*, 30 Journal of Applied Polymer Science, 1173-86 (1985). In fact, most miscible polymer blends demonstrate significant deviations from the semilogarithmic additivity found in the present invention. Paul, *Gas Transport In Homogeneous Multicomponent Polymers*, 18 Journal of Membrane Science, 75-86 (1984).

Generally, the present invention provides for gas separation membranes made from a miscible blend of polyimide polymers, each polymer having different gas transport properties (e.g., gas permeability and selectivity) when individually formed into a membrane. Because of the miscibility of certain categories of polyimide polymers, permeability and gas selectivity of a resulting blend can be customized to best suit particular applications by selecting the appropriate polymer ratio of each component in the blend to yield optimum permeability and selectively for a particular application. In particular, customized membranes prepared from the blends of this invention are extremely useful in separation processes involving, for example, $H_2$, $N_2$, $CH_4$, CO, $CO_2$, He, and $O_2$, by virtue of the fact that the polyimide blends exhibit high permeability and selectivity.

As used herein and in the accompanying claims (and as will be appreciated by one of ordinary skill in the art), the term "membrane" or "membranous structure" refers, without limitation, to structures used in separation applications, for example, thin films, thick films, composite structures, asymmetric structures, hollow fibers, modules, and like items.

BRIEF DESCRIPTION OF THE FIGURES

The invention is described in detail below with reference to FIG. 1 which is a graph of the relative permeability values of oxygen, helium, carbon dioxide, nitrogen and methane as a function of the composition of exemplary polyimide blends forming the membranes of this invention.

FIG. 2 is a graph of the relative permeability values of oxygen and nitrogen as a function of the composition of additional exemplary blends forming the membranes of this invention.

DETAILED DESCRIPTION OF THE INVENTION

Figure 1:
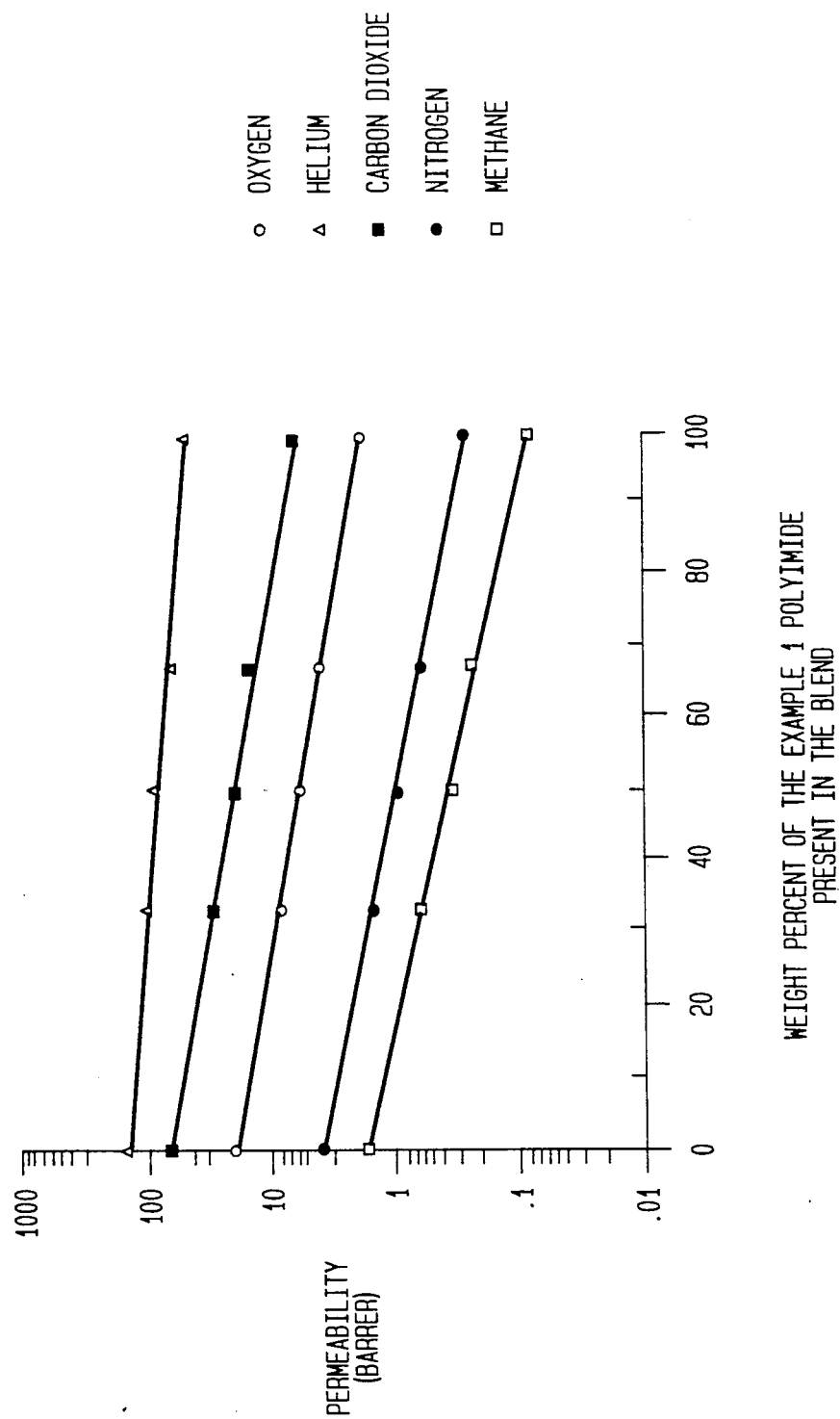

The present invention provides for customized gas separation membranes made from a miscible blend of polymers. The polymers employed in the present invention have different molecular structures and different physical properties (e.g., different gas permeability and selectivity properties when formed into a membrane) yet, surprisingly, are completely miscible and form a homogeneous blend with uniform properties.

A preferred group of polymers intended to be blended and utilized in accordance with this invention are polyimides having a structure comprising recurring units of the formula:

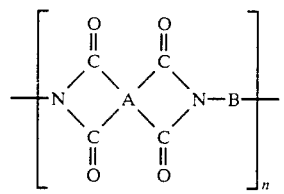

(1)

wherein the moiety A is a tetravalent aromatic radical containing at least one benzene, naphthalene or polyphenyl nucleus, the moiety B is a divalent aromatic group, and n is an integer ranging from about 15 to about 300. In order to achieve the desired solubility, thermal stability, mechanical properties, and permeability properties, at least one of the moieties A or B, or both, of each polymer present in the blend is selected respectively from a tetravalent or divalent moiety of the formula:

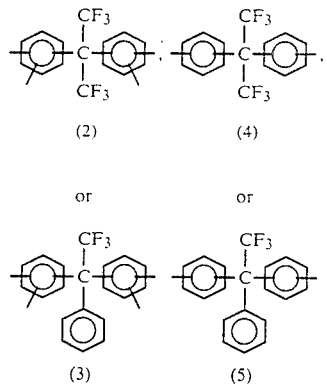

wherein any position on any of the aromatic rings of formula (2), formula (3), formula (4), and formula (5) may be substituted with a substituent independently selected from the group consisting of hydrogen, $C_1$ to $C_3$ alkyl, $C_1$ to $C_3$ alkoxy, halogen, hydroxy, $NO_2$, and $HC=CH_2$; A in formula (1) is a tetravalent radical wherein each pair of carbonyl groups are attached to adjacent carbon atoms in the ring moiety A, and more preferably A comprises a phenylene, naphthalene or bis-phenylene type compound, or mixtures of such compounds, all of which may be unsubstituted or substituted on the aromatic rings with halogen, hydroxy, $NO_2$, lower $C_1$ to $C_6$ alkyl, lower $C_1$ to $C_6$ alkoxy, and $HC=CH_2$ groups; and n is a number sufficient to provide a polyimide inherent viscosity within the range of about 0.05 to about 4.00 dL/g as measured from a solution of the polymer in dimethylacetamide at 25° C. at a polymer concentration of 0.5 weight percent. In the preferred embodiments of this invention, the substituents of the aromatic rings are hydrogen.

Polyimidese are generally prepared in a two-step process in which a dianhydride and a diamine are first reacted &o prepare a polyamic acid. The polyamic acid is then converted to a polyimide in a second step.

The preferred polyimides are prepared by reacting an aromatic diamine and an aromatic dianhydride wherein at least one of these monomers is selected from the group consisting of:

bis (3,4-dicarboxyphenyl) ether dianhydride;
2,2-bis(3,4-dicarboxyphenyl) hexafluoropropane dianhydride;
2,2-bis(3-aminophenyl) hexafluoropropane;
2,2-bis(4-aminophenyl) hexafluoropropane;
2-(3-aminophenyl)-2-(4-aminophenyl) hexafluoropropane;
2,2-hexafluoro-bis[4-(3-aminophenoxy) phenyl]propane;
2,2-hexafluoro-bis[4-(4-aminophenoxy) phenyl]propane;
1,1-bis-(4-aminophenyl)-1-phenyl-2,2,2trifluoroethane;
1,1-bis(3,4-dicarboxyphenyl)-1-phenyl-2,2,2trifluoroethane dianhydride; and mixtures thereof.

The more preferred polyimides of the present invention are prepared by reacting 2,2-bis(3,4-dicarboxyphenyl) hexafluoropropane dianhydride with an aromatic diamine having the formula:

$NH_2-Y-NH_2$ wherein Y is an aromatic moiety of a phenylene, naphthalene or a bis-phenylene type compound which may be unsubstituted or ring substituted with a halogen, hydroxy, lower $C_1$ to $C_6$ alkyl, or lower $C_1$ to $C_6$ alkoxy.

The preferred amines are diaryl diamines having the structure:

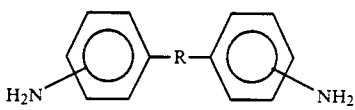

wherein R is a direct link,

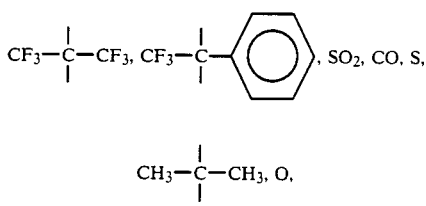

or a $C_1$ to $C_3$ alkylene linking group.

The most preferred polyimides of the present invention are prepared by reacting 2,2-bis(3,4-dicarboxyphenyl)hexafluoropropane dianhydride with a fluorine-containing diaryl diamine such as 2,2-bis(3-aminophenyl) hexafluoropropane, 2,2-bis(4-aminophenyl) hexafluoropropane, or 2-(3-aminophenyl)-2-(4-aminophenyl) hexafluoropropane to yield polyimides having recurring groups of the formula:

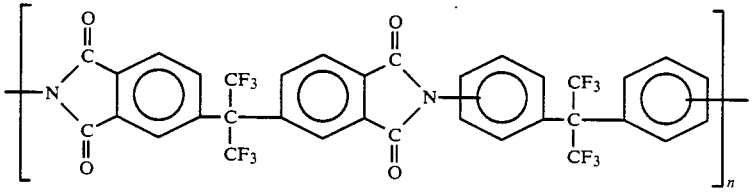

wherein n is as set forth above.

As will be appreciated by one of ordinary skill in the art, the polyimides formed from the dianhydrides and diamines illustrated in specific embodiments of the present invention can be copolymerized with each other or, for example, with one or more of the following dianhydrides or diamines:

1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
bis(3,4-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl] propane dianhydride;
2,2-bis[4-(3,4-dicarboxyphenoxy) phenyl] propane dianhydride;
4-(2,3-dicarboxyphenoxy)-4'-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-(3,4-dicarboxyphenoxy) phenyl]hexafluoropropane dianhydride;
1,1-bis[4-(3,4-dicarboxyphenoxy) phenyl]-1-phenyl-2,2,2-trifluoroethane dianhydride; and
4,4'-bis[2-(3,4-dicarboxyphenyl)hexafluoroisopropyl]-diphenyl ether dianhydride; and
m-phenylene diamine;
p-phenylene diamine;
1,3-bis(4-aminophenyl) propane;

2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl) sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl) diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl]hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,5-bis(3-aminophenyl) decafluoropentane; and mixtures thereof.

The dianhydrides used in accordance with the present invention are preferably substantially analytically pure, for example, "electronic" grade dianhydride is preferred. This grade of material contains more than 98.5% dianhydride, less than 1.5% of the corresponding monoanhydride-diacid and less than 0.1% of the corresponding tetra-acid. The 2,2-bis(3,4-dicarboxyphenyl) hexafluoropropane dianhydride (referred to herein as 6FDA) is commercially available from Hoechst Celanese Corporation, Route 202-206 North, Somerville, N.J. 08876. Electronic grade dianhydride contains less than 10 ppm sodium, less than 5 ppm iron, less than 2 ppm cobalt, and less than 2 ppm manganese, and has a melting point of 246.5 degrees Celsius.

The diamines utilized in accordance with the present invention are also preferably substantially analytically pure. For example, to obtain the preferred purity of the diamines noted hereinafter, an available grade or synthesized grade of 2,2-bis(4-aminophenyl) hexafluoropropane or 2,2-bis(3-aminophenyl) hexafluoropropane may be dissolved in aqueous hydrochloric acid and treated with activated charcoal, stirred for thirty minutes and filtered. The treatment is repeated as necessary to remove color impurities. The aqueous solution obtained after repeated filtering is treated with ammonium hydroxide until the pH of the resulting slurry is about 9. The diamine slurry is then filtered and washed with de-ionized or distilled water to form a filter cake, which in turn is redissolved in methanol and clarified through a five micron or smaller filter. Subsequently, diamine is precipitated from the methanol solution by the addition of distilled or de-ionized water and washed, also with water. The moist diamine is dried overnight in a vacuum oven and contains less than 10 ppm iron, sodium and chloride ions. Further information concerning diamines may be found in copending U.S. Pat. application Ser. No. 105,857 filed Oct. 7, 1987, in the name of James R. Hazen and entitled "A Process for Bis(4-aminophenyl) hexafluoropropane," the entire disclosure of which is incorporated herein by reference.

The solvents which may be used in the polymerization process are organic solvents, preferably anhydrous, whose functional groups do not react with either the dianhydride or diamine reactant to any appreciable extent, and in which either the dianhydride or diamine, preferably both, are soluble. Examples of suitable solvents include N,N-dialkylcartoxylamide solvents such as N,N-dimethylformamide or N,N-dimethylacetamide; N-methyl-2-pyrrolidone; gamma-butyrolactone; pyridine; diglyme; and like materials as well as mixtures of such solvents.

In general, the polyimides of this invention have a weight average molecular weight within the preferred range of from about 25,000 up to about 400,000 and more preferably from about 50,000 up to about 280,000.

In the preferred process for preparing the polyimides of this invention, approximately equimolar quantities of a dianhydride and a diamine are utilized in accordance with the process described in copending U.S. Pat. application Ser. No. 217,929 filed Jul. 12, 1988 in the names of R. Vora et al, the entire disclosure of which is incorporated herein by reference. In general, this process involves the polycondensation of a diamine and a dianhydride followed by the dehydration of the resulting polyamic acid to form a polyimide.

Preferably, the diamine is first dissolved in a polymerization solvent medium and the dianhydride is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

Polymerization is then conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with alcohol (e.g., methanol) and washed with additional alcohol.

The resulting polyimides may then be blended in accordance with the present invention using conventional solution blending technology (e.g., as noted in Example 5 below, wherein solid materials are dissolved in a common solvent in a single vessel) to yield a blend having specifically tailored properties.

The preferred polyimides utilized in the present invention are miscible with one another at all polymer blend ratios, as evidenced by a single glass transition temperature (Tg° C.) which is between the highest and lowest glass transition temperatures attributable to respective individual polymer components employed in the blend. As used herein (and in the accompanying claims), the term "miscible" is intended to refer to a polymer blend (which comprises multiple polymer and/or copolymer components) that exhibits a single glass transition temperature (Tg° C.) as measured by standard differential scanning calorimetry (DSC) techniques after the blend has been heated to a temperature above the highest glass transition temperature attributable to a respective individual polymer and/or copolymer component comprising the blend, and subsequently cooled.

Some polyimides may not initially be completely miscible with other polyimides. Therefore, blends of such polyimides can be further treated to enhance miscibility. For example, a solution 50/50 blend of the polyimide based on the condensation product of 2,2-bis(3-aminophenyl) hexafluoropropane (3,3'6F-Diamine) and 2,2-bis(3,4 dicarboxyphenyl) hexafluoropropane dianhydride and the polyimide based on the condensation product of 2,2-bis(4-aminophenyl) hexafluoropropane (4,4'6F-Diamine) and bis(3,4-dicarboxyphenyl) ether dianhydride (ODPA) may not initially be miscible by solution blending alone. However, by evaporating the solvent and subjecting the blend to a heat treatment step at about 350°–400° C. for about 1 or more hours, the blend components were completely miscible as evidenced by a single uniform Tg° C.

To prepare membranes in accordance with this invention, the resulting blend solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

For purposes of brevity only, and not by way of limitation, certain terminology, measurements, and procedures are now enumerated. Unless otherwise indicated, terms are used throughout as indicated below.

INHERENT VISCOSITY

The inherent viscosity of polymer samples was obtained by measuring the viscosity of the polymer solution and the solvent, and the inherent viscosity (IV) was calculated from the following equation:

$$IV = \frac{\ln(V_{ps}/V_s)}{C}$$

where ln is the natural logarithm, $V_{ps}$ is the viscosity of the polymer solution, $V_s$ is the viscosity of the solvent, and C is the concentration expressed in grams of polymer per 100 milliliters of solution. In all cases, inherent viscosity was measured using 0.5 grams of polymer or reaction mixture in 100 ml of dimethyl acetamide at 25 degrees Celsius.

MOLECULAR WEIGHT DATA

The molecular weight of the polymers, whether weight average molecular weight (Mw) or number average molecular weight (Mn), was measured by gel permeation chromatography (GPC) performed on dilute solutions of the polymer. The apparatus employed consists generally of a programmable automatic sampler, vacuum pump, chromatography columns, and a differential refractometer connected to a data reduction system with accompanying software. The system is calibrated using multiple standards which are currently available. With the system thus calibrated, the weight average molecular weight (Mw), the number average molecular weight (Mn), and the polydispersity (Mw/Mn) were obtained for polymers produced in accordance with the examples given hereinafter.

GLASS TRANSITION TEMPERATURE

Glass transition temperature (Tg) was determined by differential scanning calorimetry (DSC). Glass transition temperature by this method is generally defined as the point of intersection of tangent lines about the point of first inflection of the heating curve of the polymer.

THERMOGRAVIMETRIC ANALYSIS

Thermogravimetric analysis (TGA) was performed at 20° C./min with an air rate of 80 cc/min. TGA values given herein are for five percent (5%) weight loss, i.e., the temperature at which 5% weight loss occurs using this procedure.

BARRER PERMEATION COEFFICIENT

The standard unit for measuring the permeability of gasses through membranes is defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein
cm$^3$/sec (STP) is the flux (flow rate) in units volume per seconds of permeated gas at standard temperature and pressure,
cm. is the thickness of the film,
cm$^2$ is the area of film, and
cm. Hg is the pressure (or driving force).

SELECTIVITY

The selectivity of a membrane in separating a two-component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, $\alpha$ H$_2$/CH$_4$=200 indicates that the subject membrane allows hydrogen gas to pass through at a rate 200 times that of methane.

The invention will now be further illustrated by way of the following Examples, which are considered to be illustrative only, and non-limiting.

EXAMPLES OF POLYIMIDE PREPARATION

The following examples are illustrative of the preparation of polyimides suitable for making the blends of this invention.

EXAMPLE 1

Polyimide of 6FDA and 3,3' 6F-Diamine

This example relates to a polymer of 2-bis(3-aminophenyl) hexafluoropropane (3,3'6F-Diamine) and 2,2-bis(3,4 dicarboxyphenyl) hexafluoropropane dianhydride (6FDA). A three neck flask was fitted with a stirrer, condenser, ice water bath, thermometer and nitrogen atmosphere. To the flask, 267.2 gm (0.8 mole) of 2,2-bis(3-aminophenyl) hexafluoropropane along with 1000 grams of freshly distilled N-methyl pyrrolidone (NMP) was charged. The mixture was agitated for several minutes at room temperature to yield a clear, slightly yellow solution. The solution was then cooled to below room temperature (about 15° C.), and 355.2 grams (0.8 mole) of 6FDA were added portion wise in equal intervals and amounts over a period of about thirty minutes. The addition of anhydride was carefully executed while the reaction mixture was agitated gently so that the solution was maintained between 15° and 25° C.

After the addition of 6FDA, the beakers containing monomers were washed with an additional 1490 grams of NMP, and the NMP and residual monomer were added to the reaction mixture to obtain a solution of about twenty percent nonvolatile concentration. The mixture, maintained at a uniform temperature between about 25° and 30° C., was agitated gently for about 16 hours and a sample of the polyamic acid formed was withdrawn for viscosity analysis. To the polymerized mixture, 78.2 grams of beta-picoline were added and fully dispersed. After the beta-picoline addition, 782.0 grams of acetic anhydride were added dropwise, and the mixture was agitated gently for an additional twenty-two hours (also at 25°–30° C., uniform temperature) to complete cyclization.

The above process, and those processes described below, were all carried out in a dry nitrogen atmosphere.

The polymer formed as above was precipitated from solution in methanol by the addition of methanol to the reaction liquor, that is, by reverse precipitation, using 2000 ml. of methanol for every 500 g of polymeric solution. The resulting polymer was then washed with additional fresh methanol. The properties of the polymer (after drying) and polyamic acid were as follows:

| Material (Property) | Value |
| --- | --- |
| Polyamic Acid (IV, dL/g) | 1.06 |
| Polyimide (Mw) | 174,100 |
| Polyimide (Mn) | 65,500 |
| Polyimide (polydispersity, Mw/Mn) | 2.66 |
| Polyimide (IV, dL/g) | 0.83 |
| Polyimide (Tg) | 247° C. |
| Polyimide (TGA, 5% wt. loss at) | 540° C. |

EXAMPLE 2

Polyimide of 6FDA and 4,4' 6F-Diamine

In accordance with the procedure outlined in Example 1, a polyimide was prepared using the following materials:
133.6 grams (0.4 mole) 2,2-bis(4-aminophenyl) hexafluoropropane (4,4' 6F-Diamine)
177.60 grams (0.4 mole) 6FDA
1418.00 grams freshly distilled NMP
393.50 grams acetic anhydride
39.35 grams beta-picoline.

Approximate reaction times and temperatures were as follows:

| | |
| --- | --- |
| Reactant mixing in 1000 g NMP: | 35 minutes |
| Polymerization time at 20 percent concentration: | 19 hours |
| Polymerization temperature: | 20-25° C. |
| Cyclization time: | 20 hours |
| Cyclization temperature: | 25-30° C. |

The properties of the resulting polymer (after drying) and polyamic acid were as follows:

| Material (property) | Value |
| --- | --- |
| Polyamic Acid (IV, dL/g) | 1.09 |
| Polyimide (Mw) | 209,000 |
| Polyimide (Mn) | 96,400 |
| Polyimide (polydispersity, Mw/Mn) | 2.2 |
| Polyimide (IV, dL/g) | 0.95 |
| Polyimide (Tg) | 322° C. |
| Polyimide (TGA, 5% wt. loss at) | 525° C. |

EXAMPLE 3

Polyimide of ODPA and 3,3' 6F-Diamine

In accordance with the procedure outlined in Example 1, a polyimide was prepared using the following materials:
50.1 grams (0.15 mole) 2,2-bis(3-aminophenyl) hexafluoropropane (3,3' 6F-Diamine)

46.5 grams (0.15 mole) bis(3,4-dicarboxyphenyl) ether dianhydride (ODPA)
386.4 grams freshly distilled NMP
120.88 grams acetic anhydride
12.09 grams beta-picoline Approximate reaction times and temperatures were as follows:

| Reactant mixing in 200 g NMP: | 30 minutes |
|---|---|
| Polymerization time at 20 percent concentration: | 16 hours |
| Polymerization temperature: | 20–25° C. |
| Cyclization time: | 22 hours |
| Cyclization temperature: | 20–25° C. |
| Material (Property) | Value |
| Polyamic Acid (IV, dL/g) | 0.83 |
| Polyimide (Mw) | 93,100 |
| Polyimide (Mn) | 42,500 |
| Polyimide (polydispersity, Mw/Mn) | 2.2 |
| Polyimide (IV, dL/g) | 0.68 |
| Polyimide (Tg) | 225° C. |
| Polyimide (TGA, 5% wt. loss at) | 530° C. |

EXAMPLE 4

Polyimide of ODPA and 4,4' 6F-Diamine

In accordance with the procedure outlined in Example 1, a polyimide was prepared using the following materials:
334.0 grams (1.0 mole) 2,2 bis(4-aminophenyl) hexafluoropropane (4,4' 6F-Diamine)
310.0 grams (0.15 mole) bis(3,4-dicarboxyphenyl) ether dianhydride (ODPA)
2576.0 grams freshly distilled NMP
820.0 grams acetic anhydride
82.00 grams beta-picoline Approximate reaction times and temperatures were as follows:

| Reactant mixing in 1000 g NMP: | 45 minutes |
|---|---|
| Polymerization time at 20 percent concentration: | 20 hours |
| Polymerization temperature: | 20–25° C. |
| Cyclization time: | 21 hours |
| Cyclization temperature: | 20–25° C. |
| Material (property) | Value |
| Polyamic Acid (IV, dL/g) | 0.79 |
| Polyimide (Mw) | 34,000 |
| Polyimide (Mn) | 19,000 |
| Polyimide (polydispersity, Mw/Mn) | 1.81 |
| Polyimide (IV, dL/g) | 0.41 |
| Polyimide (Tg) | 308° C. |
| Polyimide (TGA, 5% wt. loss at) | 540° C. |

EXAMPLES OF POLYIMIDE BLENDS AND MEMBRANES

The following examples are illustrative of the polyimide blends and membranes made in accordance with the present invention.

EXAMPLE 5

Blends of the polyimides made in accordance with Examples 1 and 2 in the various weight ratios shown in Table 1 (1:2, 1:1, 2:1), and a blend of the polyimides made in accordance with Examples 3 and 4 in the weight ratio shown in Table 1 (1:1) were prepared as follows.

Forty milliliters of methylene chloride were stirred vigorously, and amounts of the two polymers were selected and dissolved in the methylene chloride solvent to give a total solids concentration of 3–5% by weight. If a solution was cloudy, hexafluoroisopropanol was added dropwise until a clear solution was obtained. The solution was then filtered through a 0.2 micron teflon filter and subsequently degassed by subjecting the solution to a vacuum. Solutions comprising 100% of the polymers of Examples 1, 2, 3, and 4 were also prepared.

EXAMPLES 6–13

Each of the solutions of Example 5 were cast as films in the following manner. The solution was poured into an aluminum ring on a glass plate inside a glove bag with a methylene chloride saturated atmosphere. The film was then allowed to dry inside the glove bag for 4–16 hours. Following this drying phase, the plate was removed from the glove bag and submerged in water to remove the film. The film was then dried in a vacuum oven at ambient temperature for 24 hours, and then dried at 200° C. for 24 hours.

The thicknesses of the films thus prepared ranged from about 20 to 80 microns.

Each of the films (membranes) prepared in Examples 6–13 (and having the composition as set forth in Table 1) was tested for miscibility using standard differential scanning calorimetry (DSC) techniques as noted previously. Each of the films exhibited a single glass transition temperature (Tg), which was between the glass transition temperatures attributable to the respective individual polymer components employed, thereby demonstrating the miscibility of the respective polymer components employed to make each film.

Each of the films (membranes) prepared in Examples 6–13 (and having the composition as set forth in Table 1) was also tested for permeability with respect to various gasses, for example, helium, methane, carbon dioxide, oxygen, nitrogen, and, in two cases, hydrogen. The standard test method used is a modified and equivalent version of the method described in ASTM-D-1434-82 (manometric method). That is, the membrane is sandwiched in a steel cell which is connected to a tubing system and reservoir inside of a temperature controlled environment. Initially, the system is evacuated on both the upstream and the downstream sides of the membrane for several hours. The rate of increase in downstream pressure is recorded as the leak rate of the system. Gas is admitted on one side of the sample at a fixed pressure. This up-stream pressure is much greater than the downstream pressure for the duration of the experiment, so that changes in the pressure differential due to permeation can be ignored. The downstream increase in pressure (minus the measured leak rate) is recorded and plotted with respect to time with a Digital Equipment Corp. PDP/11 micro computer. The permeability results for each of the membranes tested are set forth in Table 1.

As is evident from an examination of the data in Table 1, permeability decreases for all gasses as the ratio of the polymer of Example 1 or the polymer of Example 3 present in the respective blend increases; and, at the same time, the selectivity (in terms of the separation of various gasses) increases as the ratio of the polymer of Example 1 or the polymer of Example 3 in the respective blend increases. This, permeability and selectivity can be tailored to meet optimum requirements in any given application by appropriate selection of the ratios of polymer components present in the blend. In this regard, the permeability variations (as a function of blend composition) are illustrated in FIG. 1 and FIG. 2 wherein the blend composition is plotted against the logarithm of the permeability values for various gasses, e.g., oxygen, helium, carbon dioxide, nitrogen and methane.

In general, the membranes in accordance with the present invention exhibit a permeability of at least 15 Barrers with respect to helium, at least 0.4 Barrers with respect to oxygen, at least 0.05 Barrers with respect to nitrogen, at least 3.0 Barrers with respect to $CO_2$, and at least 0.04 Barrers with respect to methane. The membranes may also be characterized as exhibiting an ideal separation factor ($\alpha$) of at least about 85 with respect to a helium/methane mixture, at least 35 with respect to a $CO_2$/methane mixture, at least about 2 with respect to a nitrogen/methane mixture, and at least about 4.5 with respect to an oxygen/nitrogen mixture.

While the invention has been described in connection with what is presently considered to be the most practical and preferred embodiments, it is to be understood that the invention is not to be limited to the disclosed embodiments, but on the contrary, is intended to cover various modifications and equivalent compositions included within the spirit and scope of the appended claims.

is selected respectively from a tetravalent or divalent moiety of the formula:

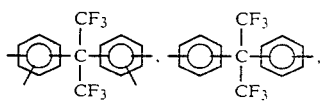

(2)        (4)

or         or

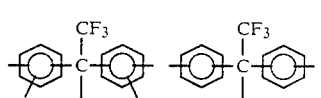

(3)        (5)

wherein any position on any of the aromatic rings of formula (2), formula (3), formula (4), or formula (5) is substituted with a substituent independently selected from the group consisting of hydrogen, $C_1$ to $C_3$ alkyl, $C_1$ to $C_3$ alkoxy, halogen, hydroxy, $NO_2$, and $HC=CH_2$.

2. The structure of claim 1 wherein at least one of said

TABLE 1

Permeabilities (P) and selectivities (P/P) of illustrative polyimide membranes are noted below. The permeabilities and selectivities of the identified gasses were measured at 35° C., and the upstream pressure was 10 atm for He, $CO_2$, $N_2$, and $CH_4$, and 2 atm for $O_2$ and $H_2$.

| Membrane Examples | Polymer Membrane Composition | $PH_2$ (*) | PHe (*) | PHe/$PCH_4$ | $PCO_2$ (*) | $PCO_2$/$PCH_4$ | $PO_2$ (*) | $PN_2$ (*) | $PN_2$/$PCH_4$ | $PCH_4$ (*) | $PO_2$/$PN_2$ |
|---|---|---|---|---|---|---|---|---|---|---|---|
| 6 | 100% Ex. 2 | — | 137 | 85.6 | 63.9 | 39.9 | 16.3 | 3.5 | 2.2 | 1.6 | 4.7 |
| 7 | 67% Ex. 2 33% Ex. 1 | — | 99.0 | 171 | 27.4 | 47.2 | 7.89 | 1.42 | 2.45 | 0.58 | 5.6 |
| 8 | 50% Ex. 2 50% Ex. 1 | 59.1 | 83.1 | 252 | 17.2 | 52.1 | 5.54 | 0.93 | 2.82 | 0.33 | 6.0 |
| 9 | 33% Ex. 2 67% Ex. 1 | — | 61.0 | 277 | 15.1 | 68.6 | 3.67 | 0.59 | 2.68 | 0.22 | 6.2 |
| 10 | 100% Ex. 1 | 27.0 | 48.0 | 600 | 5.1 | 63.8 | 1.8 | 0.26 | 3.25 | 0.08 | 6.9 |
| 11 | 100% Ex. 4 | — | — | — | — | — | 2.31 | 0.40 | — | — | 5.7 |
| 12 | 50% Ex. 3 50% Ex. 4 | — | — | — | — | — | 0.87 | 0.14 | — | — | 6.2 |
| 13 | 100% Ex. 3 | — | — | — | — | — | 0.44 | 0.05 | — | — | 8.3 |

*Permeabilities in Barrers.

1 Barrer = $10^{-10} \frac{cm^3 (STP) \, cm}{cm^2 \, sec \, cm \, Hg}$

What is claimed is:

1. A membranous structure for gas separation comprising a miscible blend of at least two polyimide polymers having different molecular structures and different gas transport properties, each of said polyimide polymers having recurring groups of the structure:

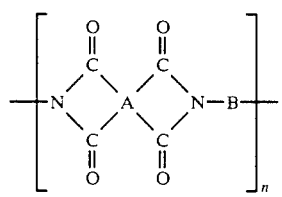

wherein the moiety A is a tetravalent aromatic radical containing at least one benzene, naphthalene or polyphenyl nucleus, the moiety B is a divalent aromatic group, and n is an integer ranging from about 15 to 300, and wherein at least one of the moieties A or B, or both, is selected respectively from a tetravalent or divalent moiety of the formula:

tetravalent aromatic radicals or said divalent aromatic radicals are the residuum of monomers selected from the group consisting of 2,2-bis(3,4-dicarboxyphenyl)-hexafluoropropane dianhydride; 2,2-bis(3-aminophenyl) hexafluoropropane; 2,2-bis(4-aminophenyl) hexafluoropropane; 2-(3-aminophenyl)-2-(4-aminophenyl) hexafluoropropane, 2,2-hexafluoro-bis[4-(3-aminophenoxy) phenyl propane]; 2,2-hexafluoro-bis[4-(4-aminophenoxy) phenyl propane]; 1,1-bis-(4-aminophenyl)-1-phenyl-2,2,2-trifluoroethane; 1,1-bis(3,4-dicarboxyphenyl)-1-phenyl-2,2,2-trifluoroethane dianhydride and mixtures thereof.

3. The structure of claim 1 wherein at least one of said polyimides is the polymer condensation product of 2,2-bis(3,4-dicarboxyphenyl) hexafluoropropane dianhydride with a diamine selected from the group consisting of 2,2-bis(3-aminophenyl) hexafluoropropane, 2,2-bis(4-aminophenyl) hexafluoropropane and 2-(3-aminophenyl)-2-(4aminophenyl) hexafluoropropane.

4. The structure of claim 3 wherein at least two of said polyimides are said polymer condensation products.

5. The structure of claim 4 wherein one of said polyimides is the polymer condensation product of 2,2-bis(3,4-dicarboxyphenyl) hexafluoropropane dianhydride and 2,2-bis(3-aminophenyl) hexafluoropropane and another of said polyimides is the polymer condensation product of said dianhydride and 2,2-bis(4-aminophenyl) hexafluoropropane.

6. The structure of claim 1 wherein at least one polyimide polymer has a weight average molecular weight within the range of from about 25,000 up to about 400,000.

7. The structure of claim 1 wherein at least one polyimide polymer has a weight average molecular weight within the range of from about 50,000 up to about 280,000.

8. The structure of claim 1 wherein said membranous structure exhibits a permeability of at least about 15 Barrers with respect to helium.

9. The structure of claim 8 wherein said membranous structure exhibits a permeability of at least about 0.4 Barrers with respect to oxygen.

10. The structure of claim 9 wherein said membranous structure exhibits a permeability of at least about 0.05 Barrers with respect to nitrogen.

11. The structure of claim 1 wherein said membranous structure exhibits an ideal separation factor of at least about 85 with respect to a helium/methane mixture.

12. The structure of claim 1 wherein said membranous structure exhibits an ideal separation factor of at least about 35 with respect to a carbon dioxide/methane mixture.

13. The structure of claim 1 wherein said membranous structure exhibits an ideal separation factor of at least about 2 with respect to a nitrogen/methane mixture.

14. The structure of claim 1 wherein said membranous structure exhibits an ideal separation factor of at least about 4.5 with respect to an oxygen/nitrogen mixture.

15. In a process for separating gasses comprising bringing two or more gasses under pressure into contact with a molecularly permeable membrane formed of an aromatic polyimide wherein said pressure causes the selective permeation of at least one of said gasses through said membrane, the improvement comprising utilizing as a polymeric membranous structure the structure of claim 1.

16. The process of claim 15 wherein said membrane exhibits a permeability of at least about 15 Barrers with respect to helium.

17. The process of claim 16 wherein said membrane exhibits a permeability of at least about 0.4 Barrers with respect to oxygen.

18. The process of claim 17 wherein said membrane exhibits a permeability of at least about 0.05 Barrers with respect to nitrogen.

19. The process of claim 15 wherein said membrane exhibits an ideal separation factor of at least about 85 with respect to a helium/methane mixture.

20. The process of claim 15 wherein said membrane exhibits an ideal separation factor of at least about 35 with respect to a carbon dioxide/methane mixture.

21. The process of claim 15 wherein said membrane exhibits an ideal separation factor of at least about 2 with respect to a nitrogen/methane mixture.

22. The process of claim 15 wherein said membrane exhibits an ideal separation factor of at least about 4.5 with respect to an oxygen/nitrogen mixture.

* * * * *